US010402046B2

(12) United States Patent
Pippuri et al.

(10) Patent No.: US 10,402,046 B2
(45) Date of Patent: Sep. 3, 2019

(54) DOWNLOADING OF CONTENT (71) Applicant: NOKIA CORPORATION, Espoo (FI)

(72) Inventors: Sami Petteri Pippuri, Bristol (GB); Risto Matias Ylivainio, Vancouver (CA)

(73) Assignee: Nokia Corporation, Espoo (FI)

( * ) Notice: Subject to any disclaimer, the term of this patent is extended or adjusted under 35 U.S.C. 154(b) by 1056 days.

(21) Appl. No.: 14/520,897

(22) Filed: Oct. 22, 2014

(65) Prior Publication Data
US 2015/0040022 A1    Feb. 5, 2015

Related U.S. Application Data

(63) Continuation of application No. 11/835,236, filed on Aug. 7, 2007, now abandoned.

(51) Int. Cl.
*G06Q 30/00* (2012.01)
*G06F 17/30* (2006.01)
(Continued)

(52) U.S. Cl.
CPC .......... *G06F 3/0482* (2013.01); *G06F 16/258* (2019.01); *G06F 16/4387* (2019.01);
(Continued)

(58) Field of Classification Search
CPC .................. G06F 3/0482; G06Q 30/0633
See application file for complete search history.

(56) References Cited

U.S. PATENT DOCUMENTS 7,043,447 B2    5/2006    Hughes et al.
7,231,176 B2    6/2007    Levy
(Continued)

FOREIGN PATENT DOCUMENTS

EP    1187078 A2    3/2002

OTHER PUBLICATIONS

Editors, B. (Apr. 23, 1999). Sensory science participating in internet music evolution through equity investment in GoodNoise; full-featured MP3 personal Recorder/Player nears market. Business Wire Retrieved from https://search.proquest.com/docview/446684438?accountid=14753.*

(Continued)

*Primary Examiner* — Kathleen Palavecino
(74) *Attorney, Agent, or Firm* — Ditthavong & Steiner, P.C.

(57) ABSTRACT

Desired content may be selected from a content server and added to a wishlist or a shopping list. If the desired content is added to a wishlist, a receiving device other than the device from which the selection(s) were received may be identified or selected. The receiving device may be identified based on capabilities of the receiving device (e.g., ability to play music or video). A sample of the desired content may be selected, generated and/or customized based on the capabilities (e.g., resolution, storage capacity) of the receiving device. The sample may then be transmitted to the receiving device at a predefined time or once specified conditions have been met. Content added to a shopping list may be purchased by a user and downloaded to a selected device. The selected device may be the device on which the content was selected or an alternate device.

20 Claims, 9 Drawing Sheets

(51) Int. Cl.
  *G06F 3/0482*  (2013.01)
  *G06Q 20/10*  (2012.01)
  *H04L 29/08*  (2006.01)
  *G06Q 30/06*  (2012.01)
  *H04L 29/06*  (2006.01)
  *G06F 16/25*  (2019.01)
  *G06F 16/438*  (2019.01)

(52) U.S. Cl.
  CPC ......... *G06Q 20/10* (2013.01); *G06Q 30/0633* (2013.01); *H04L 65/60* (2013.01); *H04L 67/28* (2013.01); *H04L 67/2823* (2013.01)

(56) References Cited

U.S. PATENT DOCUMENTS

| | | |
|---|---|---|
| 2002/0026867 A1 | 3/2002 | Hasegawa et al. |
| 2003/0060157 A1 | 3/2003 | Henrick |
| 2004/0073925 A1 | 4/2004 | Kinoshita |
| 2004/0261093 A1 | 12/2004 | Rebaud et al. |
| 2005/0072780 A1 | 3/2005 | Muller et al. |
| 2005/0188403 A1 | 8/2005 | Kotzin |
| 2005/0223097 A1 | 10/2005 | Ramsayer et al. |
| 2005/0283791 A1 | 12/2005 | Mccarthy et al. |
| 2006/0107330 A1 | 5/2006 | Ben-Yaacov et al. |
| 2006/0112143 A1 | 5/2006 | Subramanian |
| 2006/0167982 A1 | 7/2006 | Jawa et al. |
| 2006/0218613 A1 | 9/2006 | Bushnell |
| 2007/0121651 A1 | 5/2007 | Casey et al. |
| 2009/0036105 A1 | 2/2009 | Carion et al. |
| 2009/0037724 A1 | 2/2009 | Carion et al. |

OTHER PUBLICATIONS

Office Action for corresponding European Patent Application No. 08 788 964.8-1952, dated Jan. 31, 2017, 5 pages.
Rejection Decision for corresponding Chinese Application No. 200880102170.3, dated May 24, 2013, pp. 1-8.
Office Action for corresponding Chinese Application No. 200880102170.3, dated Sep. 24, 2012, pp. 1-14.
Office Action for corresponding Chinese Application No. 200880102170.3, dated Oct. 26, 2011, pp. 1-31.
Vetro et al., "Media Conversions to Support Mobile Users", Electrical and Computer Engineering, 2001, Canadian Conference on May 13-16, 2001, Piscataway, NJ, IEEE, vol. 1, pp. 607-612.
International Search Report and Written Opinion for International Application No. PCT/IB2008/001992, dated Aug. 27, 2009, 13 pages.
Office Action for related Chinese Patent Application No. 201508669422, dated Oct. 26, 2018, English Language Summary Included, 12 pages.
Office Action for related Chinese Patent Application No. 201508669422, dated Mar. 28, 2019 English Language Summary Included, 10 pages.

* cited by examiner

DOWNLOADING OF CONTENT

CROSS REFERENCE TO RELATED APPLICATIONS

This application is a continuation of U.S. application Ser. No. 11/835,236, filed Aug. 7, 2007, the contents of which is incorporated herein by reference in its entirety.

TECHNICAL FIELD

The invention generally relates to the downloading of content. In particular, at least some embodiments relate to downloading content or a sample thereof to a different device than that from which a selection of content is made.

BACKGROUND

More than ever, consumers are browsing, sampling and purchasing music, videos and other content from on-line vendors and service providers. A consumer will typically use a computing device to browse an on-line catalog of content published by a service provider and to select items for download or sampling. The selected content items are then downloaded or streamed to the device. However, due to the sizes, formats and other characteristics of some types of content (e.g., audio and video), some devices may be limited in their ability to receive and render content items or samples thereof. For example, mobile communication device such as a cell phone may have different capabilities than a personal computer. Thus, the personal computer may be able to download and play content that the mobile communication device might not.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a content server is configured to receive requests for content from one or more devices and to transmit the requested content or a sample thereof to a receiving device other than the requesting device that is capable of playing or rendering the requested content. Content that is selected for a wishlist may prompt the service provider to create a sample of the content and to transmit the sample to the receiving device automatically (i.e., without user intervention). The sample may be customized according to the specifications and characteristics of the receiving device. For example, a content sample may be customized to reduce resolution, shorten playtime, change formats and the like. Thus, in one example, a user using a mobile phone that is not capable of or authorized for receiving or rendering videos may add a music video to a wishlist. The service provider may then create a sample of the music video, customize the sample (if necessary), and transmit the sample to another device that is capable of or authorized for receiving and playing the sample video. Content selected for a shopping list or for purchasing may also be customized in a similar manner prior to being downloaded into the receiving device. A receiving device may be designated by a user or may be selected automatically by the service provider.

Devices may be classified into different device tiers depending on the features, specification and other characteristics of the devices. Thus, devices that are capable of rendering video, audio and text may be classified in a first tier while devices that are capable of only receiving and rendering text may be classified in a second tier. In some instances, a device may be classified based on the types of content a user authorizes the device to receive and/or play. Using such a device classification, a service provider may identify devices that are able to receive and render a particular type of content.

According to another embodiment, a service provider may publish different content service pages to different tiers of devices. The different pages may be used to enhance compatibility of the service interface with different devices. The different pages may also include different functionality and commands based on the capabilities of the different devices. Thus, a mobile device incapable or unauthorized to receive or play music or video might be restricted to adding content items to a wishlist (i.e., not allowed to add content to a shopping list). Other restrictions or features may be added to content service pages depending on the corresponding tier and capabilities associated therewith.

Still further, a user device may include a client for coordinating the transmission of a content item from a service provider. The client may run in the background of an operating system of the device and, for example, check for new content items or samples of content based on some schedule. Different clients may be used for different types of content or, alternatively, a single client may be configured to monitor for multiple types of content.

BRIEF DESCRIPTION OF THE DRAWINGS

Certain embodiments are illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
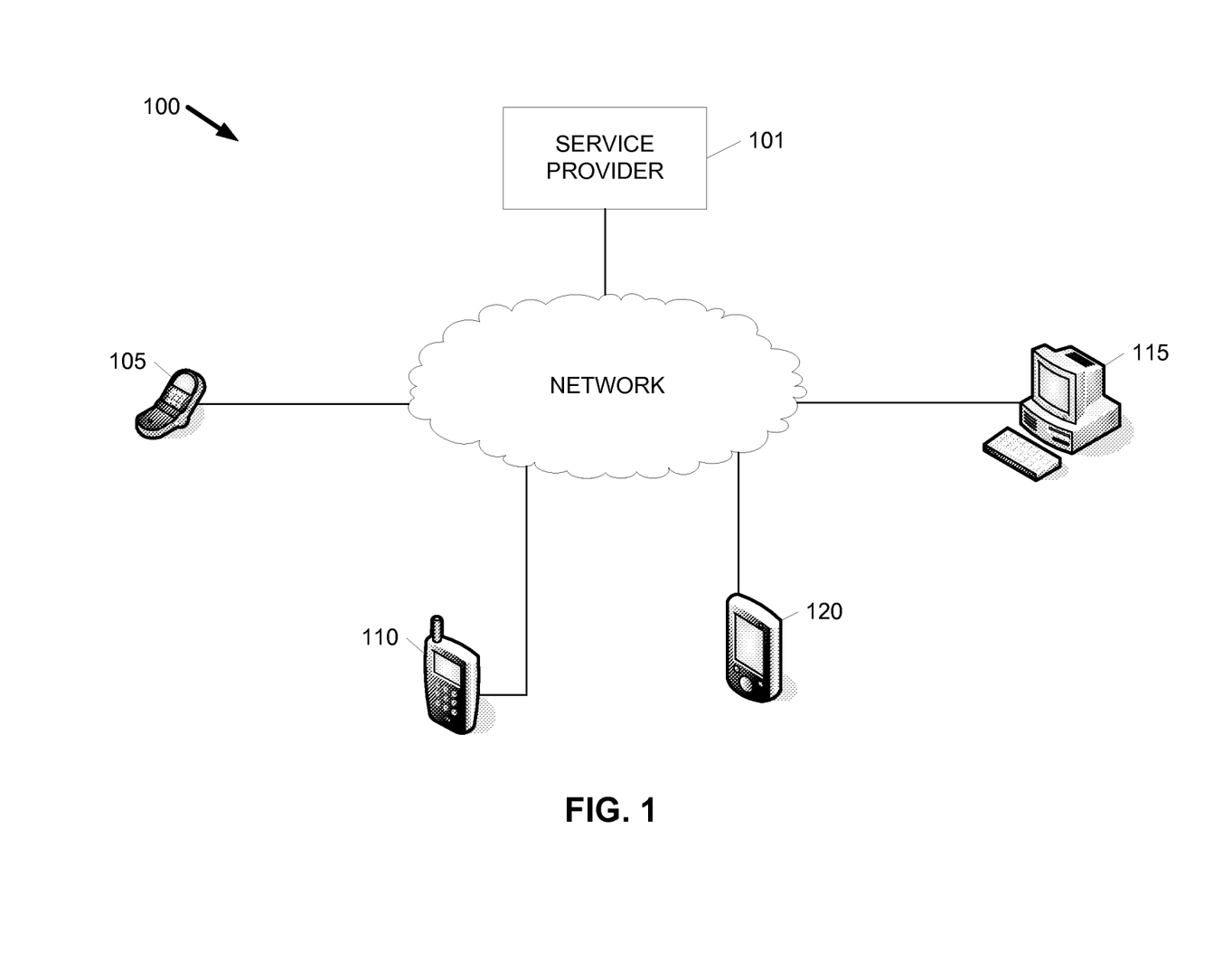
FIG. 1 illustrates a block diagram of a communication network in which one or more embodiments may be implemented.

Various embodiments may be used in a broad array of networks and communication protocols. FIG. 1 illustrates an example of a communication network through which content may be downloaded according to one or more aspects described herein. Specifically, communication network 100 includes service provider 101, mobile communication devices 105 and a mobile phone 110, personal computer (PC) 115 and personal data assistant (PDA) 120. PC, as used herein, is not limited to any particular operating system or platform. Communication through network 100 is not limited to the illustrated devices and may include other apparatuses such as a home video storage system, a portable audio/video player, a digital camera/camcorder, a positioning device such as a GPS (Global Positioning System) device, a mobile television, a STB (Set-top Box), a digital video recorder, and the like and in any combination of the aforementioned. Devices 105, 110, 115 and 120 may be connected to each other and server 101 through various types of networks. For example, mobile communication devices 105 and 110 may communicate with server 101 through a cellular network, a short range communication connection (such as a Bluetooth®, UWB (Ultra Wide Band), infrared, WiBree), a wireless local area network (WLAN) and/or a high-speed wireless data network, e.g., Evolution-Data Optimized (EV-DO) networks, Universal Mobile Telecommunications System (UMTS) networks and/or Enhanced Data rates for GSM Evolution (EDGE) networks. In one or more arrangements, mobile communication devices 105 and 110 and other devices like PC 115 and PDA 120 may communicate using a wired network communication. Further, devices 105, 110, 115 and 120 may use various communication protocols such as Internet Protocol (IP), Transmission Control Protocol (TCP), Simple Mail Transfer Protocol (SMTP) among others known in the art.

Devices 105, 110, 115 and 120 may include different capabilities and features. For example, mobile communication device 105 may include the ability to play music and/or render video while mobile communication device 110 might not have such features or capabilities. In another example, PC 115 may be configured to handle a higher processing load than mobile communication devices 105 and 110 or PDA 120. Further, according to one or more aspects, devices and/or sets of capabilities may be classified into a plurality of tiers. That is, devices having a first set of capabilities may be classified into a first tier, devices having a second set of capabilities may be classified into a second tier and so on. In one or more configurations, a second set of capabilities may be a subset of a first set of capabilities containing fewer capabilities than the first set, or partly different capabilities than the first set of capabilities. Various capabilities on which tiers may be defined include download and/or storage capacity, bandwidth of network, media rendering capabilities, digital rights management enforcement features, transceivers, network connection stability, network access costs, user preferences and the like. Thus, in one example, a mobile communication device such as device 105 may be classified in a first tier and a personal computer such as PC 115 may be classified in a second tier due to the larger storage capacity and greater rendering capabilities of PC 115.

Categorizing devices and determining device capabilities may allow a service provider to identify devices capable of rendering or receiving a particular content item. By way of example, if a user purchases video content using his or her mobile communication device (e.g., device 105) that is incapable of playing video, the service provider may automatically, or by request, download the video to a PC (e.g., PC 115) associated with the user or user's account. Users may also specify whether a device is authorized to receive certain types of content. Such restrictions may be factored into tier determination and assignment process.

Figure 2:
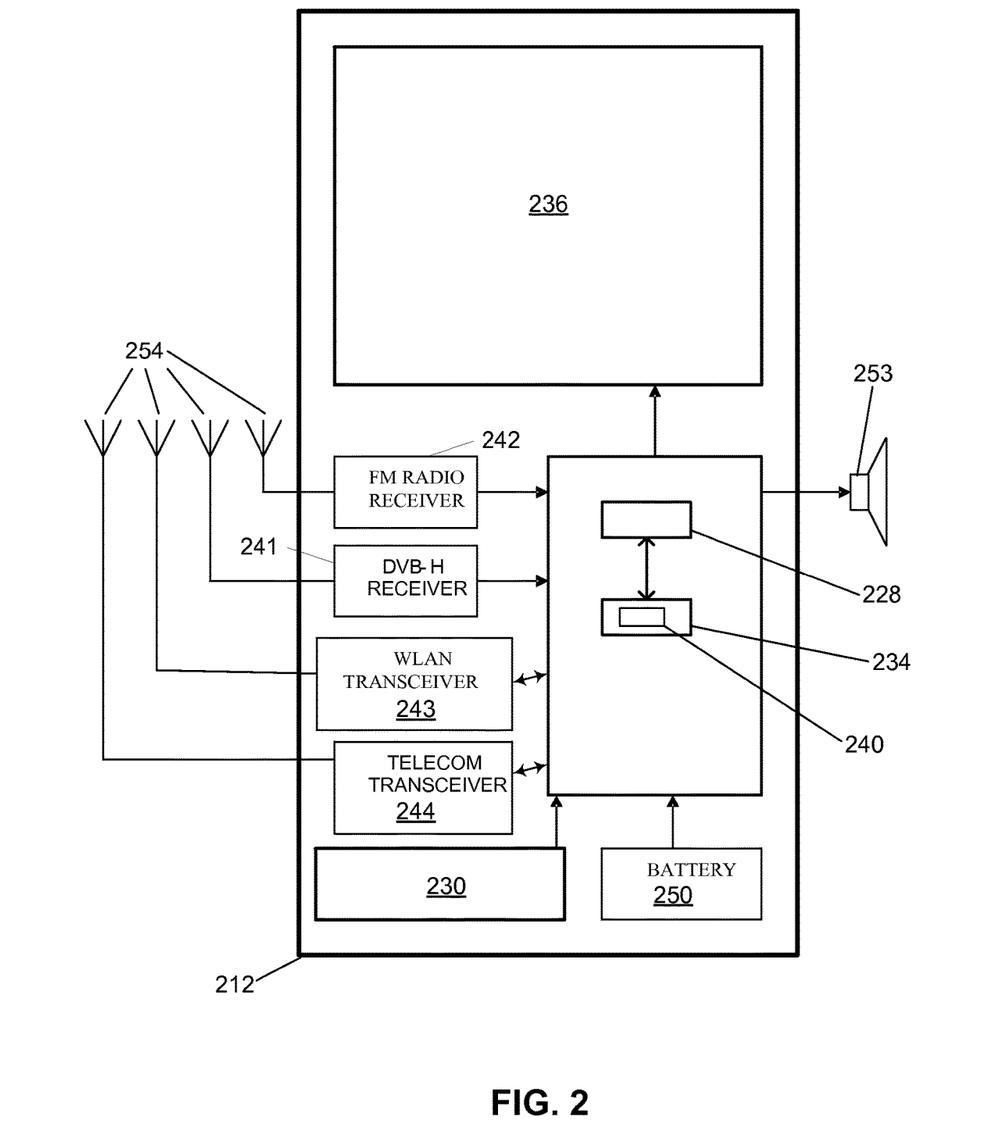
FIG. 2 is a block diagram of a communication device according to one or more aspects described herein.

FIG. 2, describing one embodiment of the invention, is a block diagram of a communication device such as mobile communication device 105 including processor 228 connected to user interface 230, memory 234 and/or other storage, and display 236. Communication device 212 may also include battery 250, speaker(s) 253 and antennas 254. User interface 230 may further include a keypad, touch screen, voice interface, one or more arrow keys, joy-stick, data glove, mouse, roller ball, touch screen, or the like. Mobile terminal 212 may comprise a computer, PDA, mobile telephone and the like.

Computer executable instructions and data used by processor 228 and other components within communication device 212 may be stored in a computer readable memory 234. The memory may be implemented with any combination of read only memory modules or random access memory modules, optionally including both volatile and nonvolatile memory. Software 240 may be stored within memory 234 and/or storage to provide instructions to processor 228 for enabling communication device 212 to perform various functions. Alternatively, some or all of communication device 212 computer executable instructions may be embodied in hardware or firmware (not shown).

Communication device 212 may be configured to receive, decode and process digital radio or television broadcast transmissions that are based, for example, on the DVB (Digital Video Broadcasting) standards, through a specific DVB receiver 241. The mobile device may also be provided with other types of receivers for digital broadcast transmissions, such as MediaFLO, DMB (Digital Multimedia Broadcasting), ISDB (Integrated Services Digital Broadcasting), HDTV (High-definition television), DAM (Digital Audio Broadcasting), DRM (Digital Radio Mondiale), etc. Additionally, communication device 212 may also be configured to receive, decode and process transmissions through FM/AM Radio receiver 242, WLAN transceiver 243, and wireless telecommunications transceiver 244. Transceivers 243 and 244 may, alternatively, be separated into individual transmitter and receiver components (not shown). In one example, transceiver 244 may include a broadcast receiver (not shown) and a backward channel receiver (not shown) for communicating over the broadcast channel and the backward channel, respectively. In one aspect of the invention, communication device 212 may receive Radio Data System (RDS) messages. Other transmission and reception systems may also be used including BLUETOOTH®, WiMAX (Worldwide Interoperability for Microwave Access) i.e., Institute of Electrical and Electronics Engineers (IEEE) 802.16 standard, and/or UWB (Ultra-wideband) transceivers. In one or more instances, signals may be transmitted to and received from another mobile terminal (not shown). For example, audio, video and other signals may be transmitted between two communication devices using various transmissions protocols such as wireless local area networks (WLANs), General Packet Radio Service (GPRS), third generation mobile system technology (3G), Bluetooth and/or Universal Plug and Play (UPnP). Such networks may be used to access or support local networks or remote networks such as the Internet.

Referring again to FIG. 1, server 101 is generally configured to distribute various types of content to devices 105, 110, 115 and 120 including media items, such as music, videos, images, ringtones, maps and text (e.g., e-books, articles), and applications (e.g., games). Server 101 may obtain or receive content from one or more content sources (not shown). These content sources may include media network servers, websites, databases storing collections of content and/or combinations thereof. To facilitate access to such content, server 101 may publish such content in one or more services. For example, server 101 may publish available content by generating a webpage listing available music and/or videos and transmitting the webpage to devices 105, 110, 115 and 120. Server 101 may further charge a fee for the service and/or for each content item. Alternatively or additionally, server 101 may offer subscriptions allowing a device or user to have unlimited access to available content for a fixed fee (e.g., a monthly or yearly subscription fee).

In one or more embodiments, server 101 may be a distributed system that comprises multiple component servers or systems. The multiple component servers may be distributed in multiple different locations or, alternatively, may be located in the same place.

Figure 3:
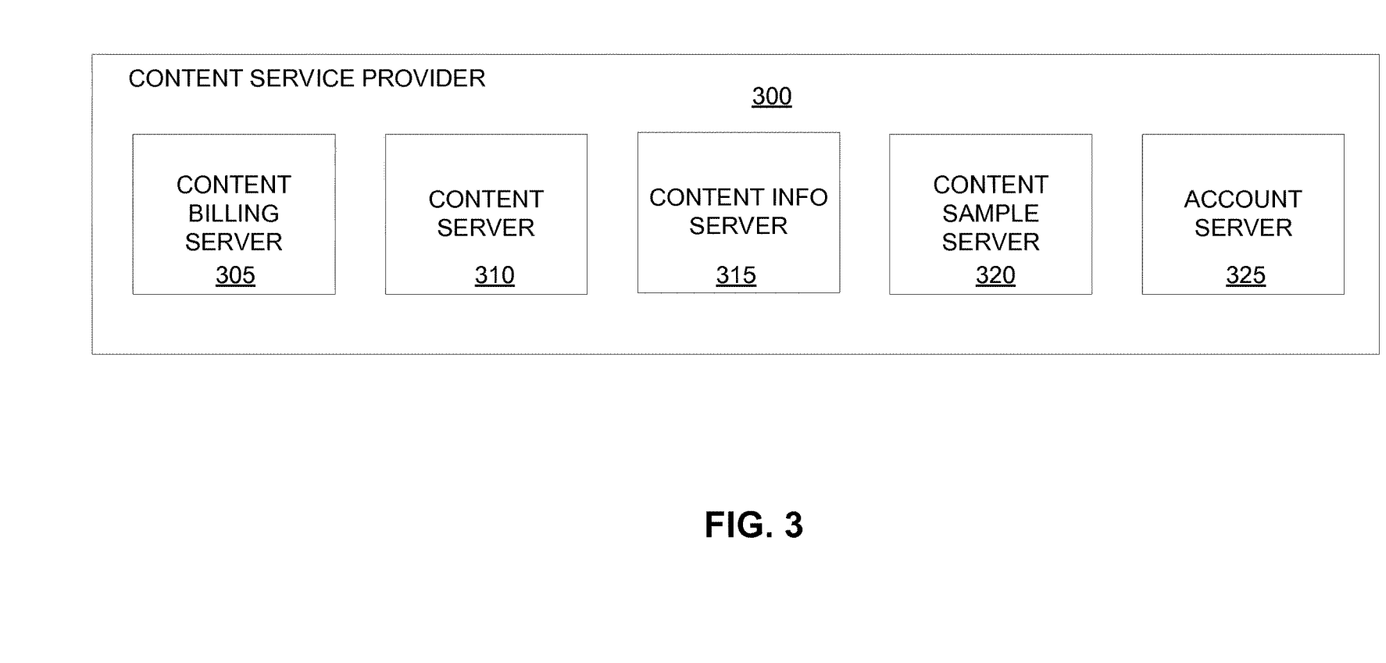
FIG. 3 is a block diagram of a server for distributing content according to one or more aspects described herein.

FIG. 3, describing one embodiment of the invention, is a block diagram of a service provider such as server 101 of FIG. 1, from which content may be received. Service provider 300 includes multiple components including content billing server 305, content server 310, content item information server 310, content sample server 320 and user account server 325. Servers 305, 310, 315, 320 and 325 may exist in firmware, software, hardware or combinations thereof and may be located in the same system or may be distributed across multiple different systems. Each of servers 305, 310, 315, 320 and 325 may communicate with each of the other servers through a direct connection or indirectly through one or more of the other servers.

Content billing server 305 is generally configured to process charges and payments for uses of the service or content items downloaded from service provider 300. For example, content billing server 305 may determine an appropriate amount to charge for a number of content items downloaded or purchased. Additionally, content billing server 305 may generate a bill for the purchaser and/or process a payment transaction, e.g., authorizing a credit card transaction or initiating an electronic funds transfer (EFT) from a purchaser's bank account. Content billing server 305 may also deduct charges from a purchaser's account if the account contains sufficient funds. Content billing server 305 may further store financial records associated with the various services provided by service provider 300 (e.g., for auditing purposes). Additionally or alternatively, content billing server 305 may be configured to monitor payments and amounts owed and to generate and send reminders for bills.

Content server 310 is configured to retrieve and store available content items. For instance, content server 310 may be configured to request content items from one or more other content servers or sources in response to a user's request. Content server 310 may determine which content items to store based on the popularity of the items, the size of the content items, an accessibility of the content items from other sources and the like. Thus, in one example, more popular content items may be stored in content server 310 for easier accessibility while other content items may be stored on other servers and retrieved from the other server upon request by a user. Content server 310 may use various protocols for storing the content items including storage by content type (e.g., music versus video), item size or category/genre.

In storing and managing content items, content server 310 operates in conjunction with content information server 315. Content information server 315 is configured to store and maintain a database of metadata or other identifying information associated with content items. Metadata stored in content information server 315 may be linked to content items stored in server 315 or otherwise identify a content item to which the information is associated. In that manner, content items may be retrieved from content server 310 and/or other servers based on associated metadata. Thus, in one example, service provider 300 may search content information server 315 to identify all movies in the sci-fi genre or all music by a specified artist.

Content sample server 320 provides samples of various content items to potential purchasers. For example, content sample server 320 is configured to create and/or store samples of content items for perusal by a purchaser and to aid the purchaser in deciding whether to purchase a content item or not. Content sample server 320 may generate samples in response to a purchaser requesting a preview of a particular content item. Alternatively, content sample server 320 may generate samples prior to receiving requests. According to one or more aspects, content sample server 320 may further be configured to generate a sample based on the specifications of the receiving device. Thus, if a device is unable to render 1080×720 video, the content sample server 320 may prepare a sample using 640×320 resolution instead. Content customization is discussed in further detail below.

Subscribers or users of the service provided by service provider 300 may create accounts that are stored by user account server 325. User account server 325 facilitates the creation, storage and maintenance of user accounts including tracking activity in the account and maintaining lists of content items that have been downloaded and/or that interest the user. For example, user account server 325 may store one or more wishlists or shopping lists of music for a user based on a user's selection, preference, purchasing history and the like. Further, user account server 325 may store payment data such as credit card numbers, bank account and routing numbers, billing address and the like so that a user does not have to repeatedly enter the information when making purchases.

User account server 325 may also store information regarding devices associated with the user including device type (e.g., mobile, PC, PDA), storage capacity, and network connection type. A user may add or associate different devices to his or her account to allow multiple devices to access the service and to receive content items. Device information may be manually specified by a user or may be automatically detected by service provider 300. For example, service provider 300 may detect bandwidth capacity using methods known in the art. Using the device information stored in user account server 325, service provider 300 is able to determine whether a purchasing device is capable of receiving and/or rendering the purchased content. If not, service provider 300 may identify an alternate device associated with the user's account that is capable and/or authorized of receiving and rendering the purchase content and transmit the content item to that device instead (or in addition to sending the purchase content to the purchasing device). Additionally, the user account may include other devices than the user's own. That is, the user account may include devices of friends, devices of family members, devices of an interest group and/or devices of a team. The user or the service provider may also initiate delivery of content samples to those devices.

Furthermore, in one or more embodiments, the categorization of devices into various tiers or categories is relevant to determining what services and content are available to those devices. For example, a service provider such as service provider 300 of FIG. 3 may publish different service pages for different tiers of devices. The pages may be optimized e.g. for Wireless Application Protocol (WAP), SMS, email, and/or web based delivery. The different pages may provide different amounts of video, text and/or images to enhance the compatibility and viewability of the page on different tiers of devices. For example, a mobile device might not be able to render video or has limited capacity for images. Thus, a page may be defined for a mobile device tier that includes fewer images (as compared to a page defined for a PC) and no video. Furthermore, the pages provided to different tiers of devices may provide different functions or commands.

Figure 4A:
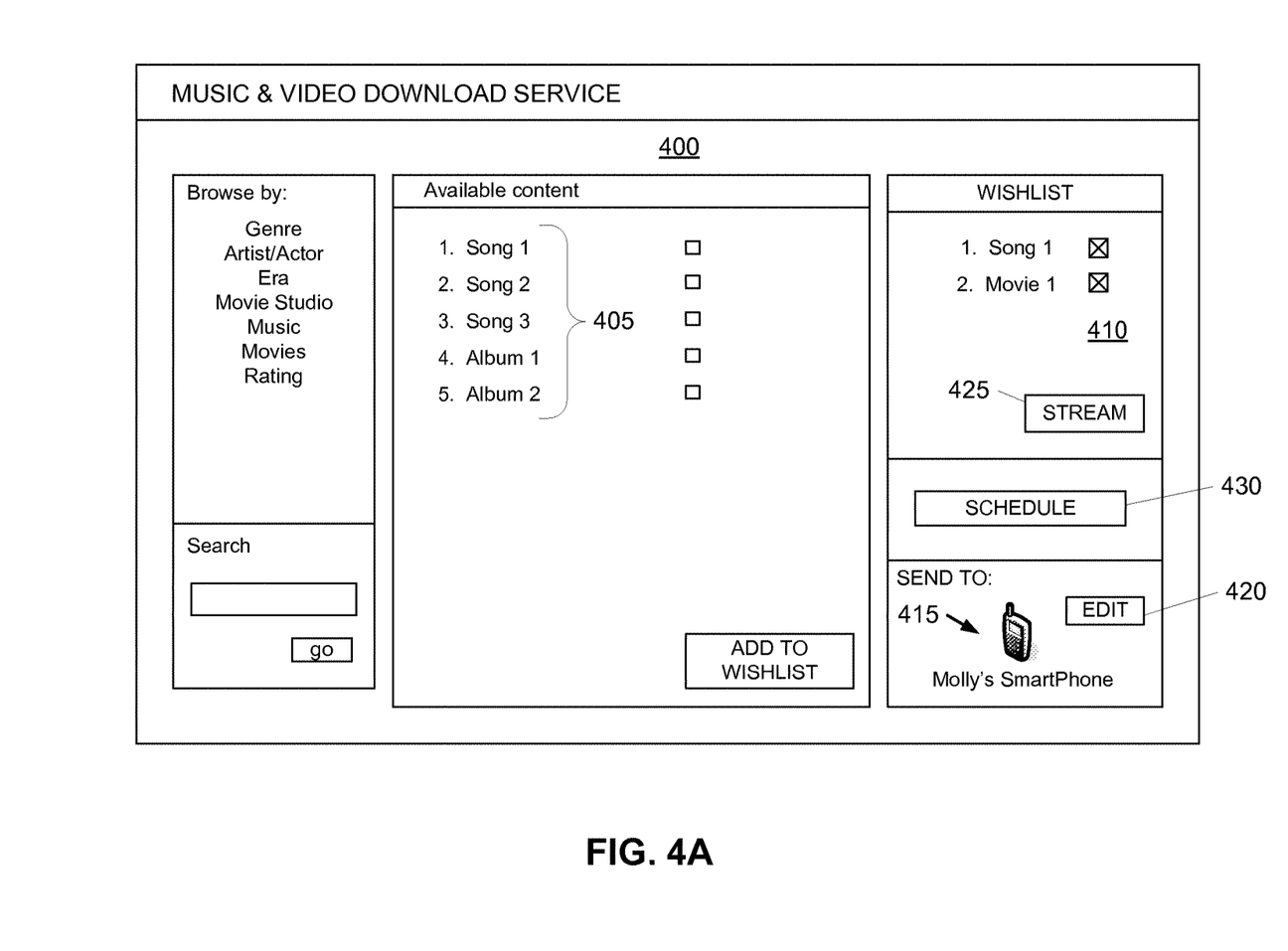
FIGS. 4A and 4B illustrate content pages for browsing and downloading content according to one or more aspects described herein.

FIG. 4A illustrates a content page 400 that, in one or more embodiments, may be provided to a tier of devices that have limited or no capability to play or receive music or to render video (e.g., due to limited bandwidth in the type of network connection, user restrictions, lack of storage, lack of music playing and/or video rendering capabilities/application, lack of a GPS application). Wishlist, as used herein, refers generally to a list of content for which samples are sent to a receiving device without a monetary transaction. Content page 400 allows devices and users thereof to identify desired content from a list of content items 405 prior to purchasing them. Samples of the identified content may then be downloaded to a different device of a tier of devices having the capability to play and receive music or video at a later time. Content page 400 includes schedule option 430 that allows a user to schedule the time or options of time frames at which the sample content item will be downloaded to the receiving device. Wishlist 410 may be displayed in content page 400 and include identification 415 of one or more devices to which the content sample will be downloaded. For example, the device may be identified by a name assigned by the user or by device model. Device change option 420 may also be included in content page 400 to allow a user to change or select the one or more receiving devices. Further, content page 400 may provide stream option 425 to allow a device to stream content such as music or videos. This option may be provided to devices that might not have the bandwidth to receive a content sample file but is able to stream content. Further, in one embodiment, a device might not have the ability to receive content items due to various reasons such as digital rights management protections or device capability limitations. However, the device may be able to receive a streaming sample or preview of a content item that is, e.g., not copyright protected or that is compatible with the device's capabilities. The streaming sample or preview may then be used to trigger a full content item download to one or more other devices.

Figure 4B:
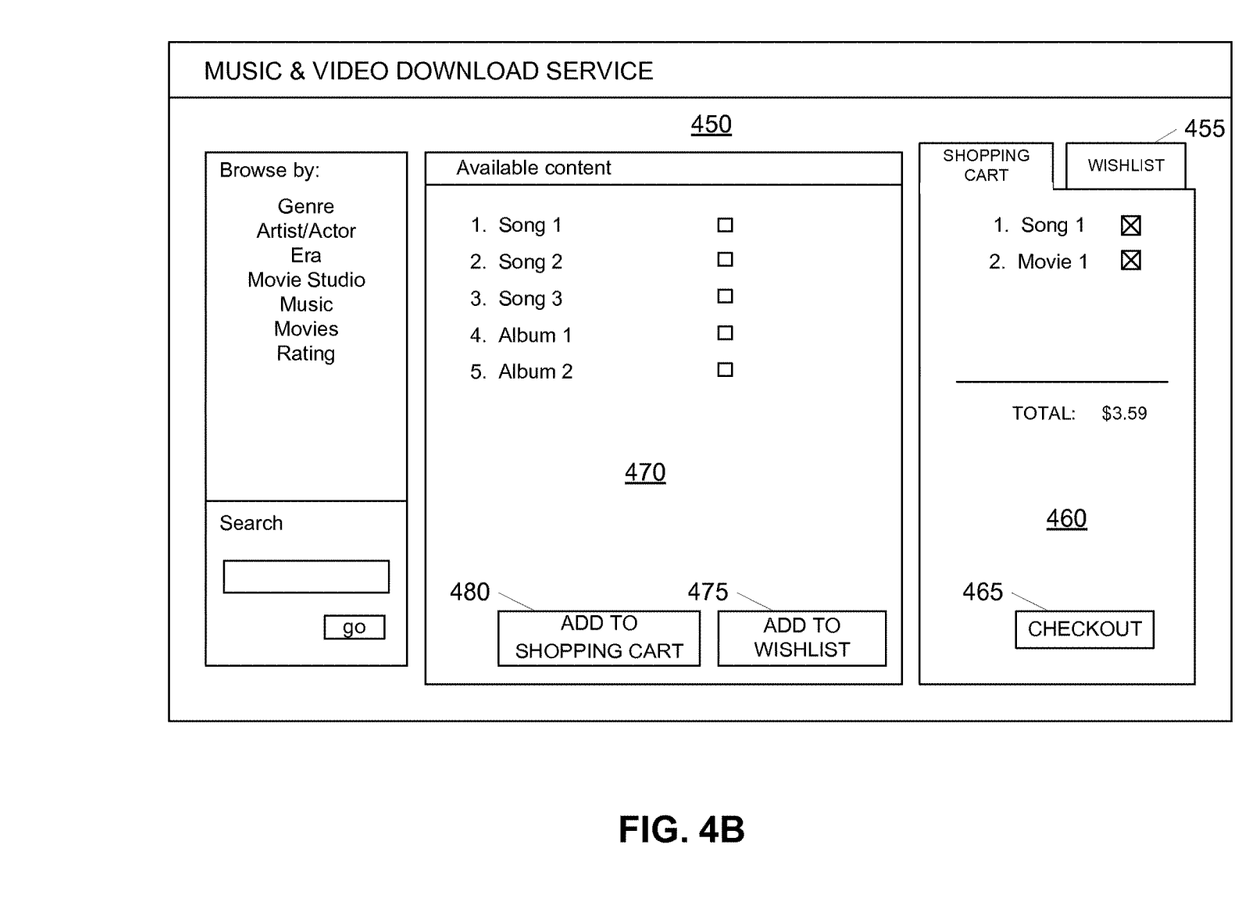

FIG. 4B, describing one embodiment of the invention, illustrates an alternative content page 450 that may be published to a device belonging to a tier of devices able to receive and/or play music and video content. Content page 450 includes a wishlist 455 in addition to shopping cart or list 460 for purchasing content items. A shopping cart or list such as list 460, unlike a wishlist, displays and stores content that is sent in its entirety to a receiving device in association with a monetary transaction. Content items may be selected for addition to a shopping cart by selecting add to shopping cart option 480. FIG. 4B illustrates a shopping cart 460 with a total calculated and checkout option 465. Additionally, a user may add content items to a wishlist using option 475 and view the wishlisted items by selecting wishlist 455 (i.e., the tab associated with wishlist 455). Wishlist 455, although not fully illustrates in FIG. 4B, may look similar to wishlist 410 of FIG. 4A.

Figure 5:
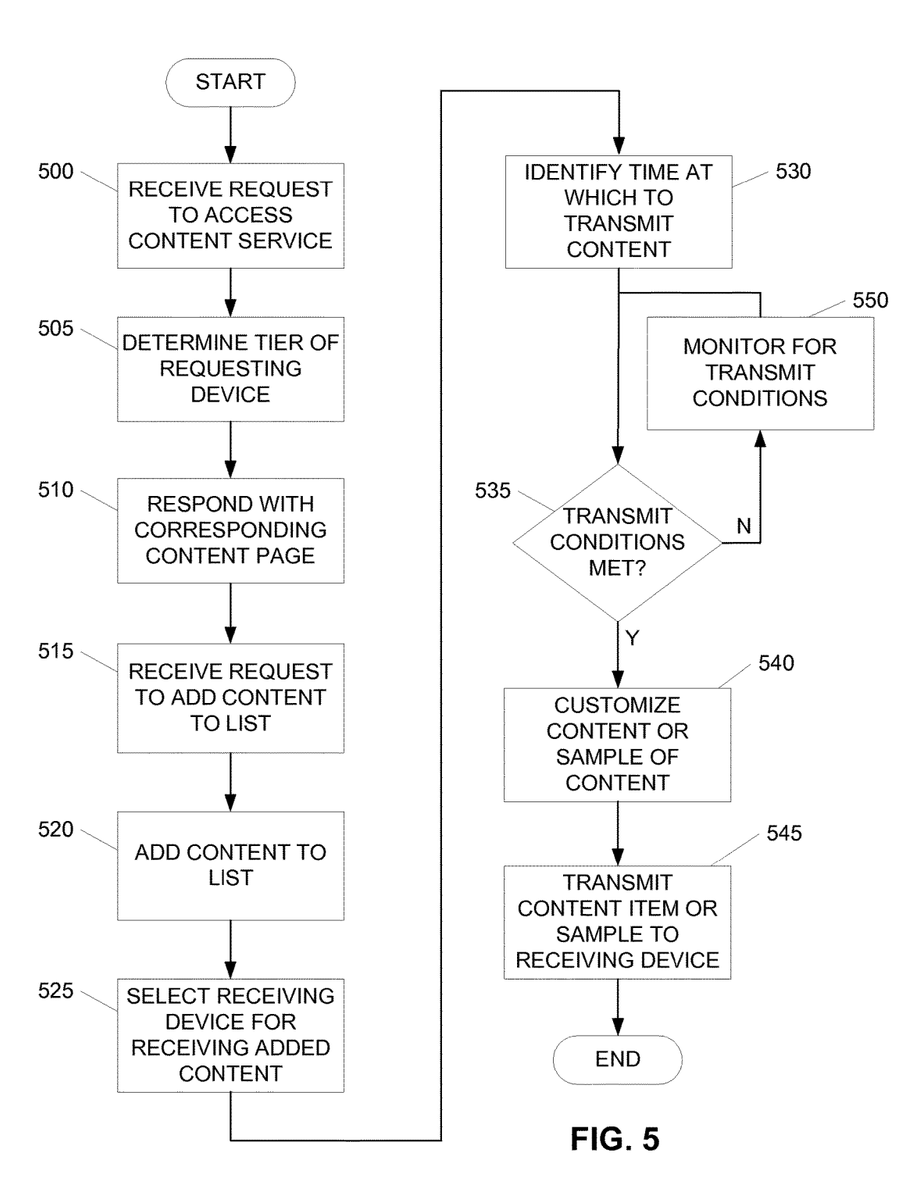
FIG. 5 is a flowchart illustrating a method for receiving and processing content requests according to one or more aspects described herein.

FIG. 5 is a flowchart for a method of receiving and processing content requests according to aspects described herein. In step 500, a service provider may receive a request to access a content download service. For example, the service provider server may receive a hypertext transfer protocol (HTTP) request from a user's device requesting access to a service page. In step 505, the service provider may determine a tier to which the user's device belongs. The determination may be made by searching a database of known or registered devices. Alternatively, the service provider may make such a determination by detecting various characteristics associated the device such as type of connection, storage capacity and the like. A default tier may be defined for devices that are unknown and for which information is not available or accessible. For example, a default tier may be defined as a set of devices having a minimal set of features and capabilities. In step 510, the service provider may respond to the access request by identifying and transmitting a page corresponding to the determined tier. Expression, style and/or content of the transmitted page may be configured corresponding to the determined tier.

In step 515, the service provider may receive a request to add a content item to a list of desired content. The list may be a wishlist or a shopping cart or a combination thereof. In response to the request, the service provider may add the specified content item to the list associated with the user or account in step 520. In addition, the service provider may automatically (e.g., without user intervention) initiate a download process including selecting one or more receiving devices to receive the content item in step 525. The receiving device may be selected based on user preferences or selections made and stored in a user account profile. Alternatively or additionally, the service provider may automatically select a device for receiving the content item based on an associated tier and device capabilities. In one or more configurations, a service provider may send the content or a sample of the content that may be modified or customized, to multiple or all devices registered to a user's account. In step 530, the service provider may identify a time at which to download the content item to the receiving device. The time may be based on a set time of day. Additionally, in the step 530 any operating condition of the receiving device may be defined. For example, if the receiving device is a mobile device, the service provider may schedule the download for when the mobile device is not roaming and/or is connected to a wireless data network or when network access costs are below a threshold. Various types of conditions may be set for the download time.

In step 535, the service provider may determine whether the download conditions have been met. If so, in step 540, the service provider may customize the content item or a portion/sample thereof (depending on whether the content item was added to a shopping cart or a wishlist, respectively) to insure compatibility with the receiving device. A content item or a portion thereof may be modified/customized based on one or more characteristics of the receiving device such as resolution, supported audio encoding formats, supported video encoding formats, storage capacity (which may affect a downloadable length) and the like. In step 545, the content item or sample may be transmitted to the receiving device. If the downloading conditions have not been met, however, the service provider may continue waiting and monitoring for the relevant conditions in step 550. In one or more arrangements, if the content item is protected by copyright protection mechanisms, the service provider may also transmit or issue a license for the content item.

A user may further purchase and download a full content item (rather than a sample) in a manner similar to that described in FIG. 5. For example, instead of generating a sample, the full content item may be customized for downloading to the identified receiving device. Once customized, the content file may be sent to the receiving device at the scheduled time. In addition, payment processing may also be performed for the purchased item.

Figure 6:
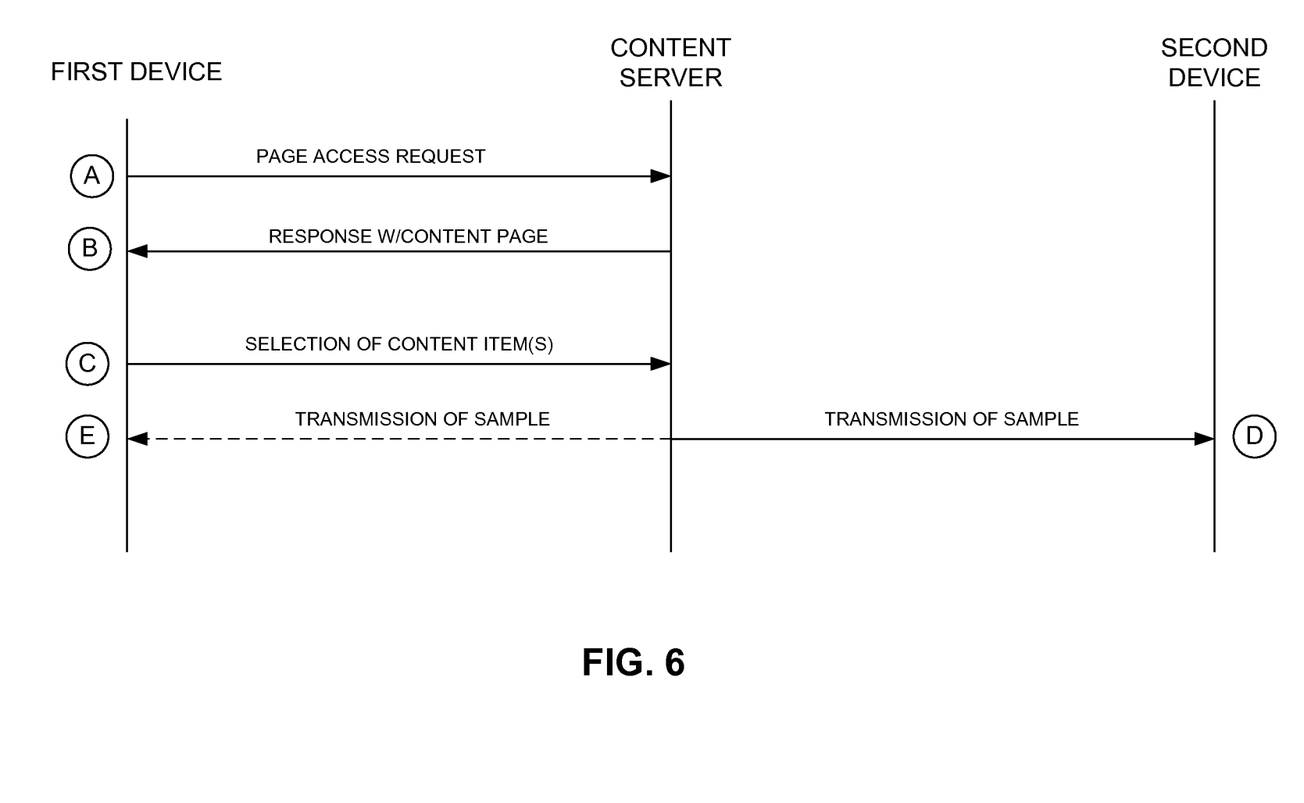
FIG. 6 is a diagram of a transmission flow between two user devices and a content server for processing a wishlist content item according to one or more aspects described herein.

FIG. 6, describing one embodiment of the invention, is a diagram showing transmission flow for wishlist content items between a first device, a service provider and a second device. Generally, the first device initially accesses a predefined page of the service provider, where the predefined page corresponds to a device tier to which the first device belongs. For example, the first device may transmit a page access request (as illustrated in step A) to the content server (i.e., service provider). In step B, the content server may respond with a content page. The first device then selects content for addition and sends those selections to the service provider, e.g., step C. Samples of the selected content are then transmitted to the second device in step D. Again, the samples may be customized based on the needs and characteristics of the second device. The sample of the selected content may optionally be sent to the first device as well in step E.

Figure 7:
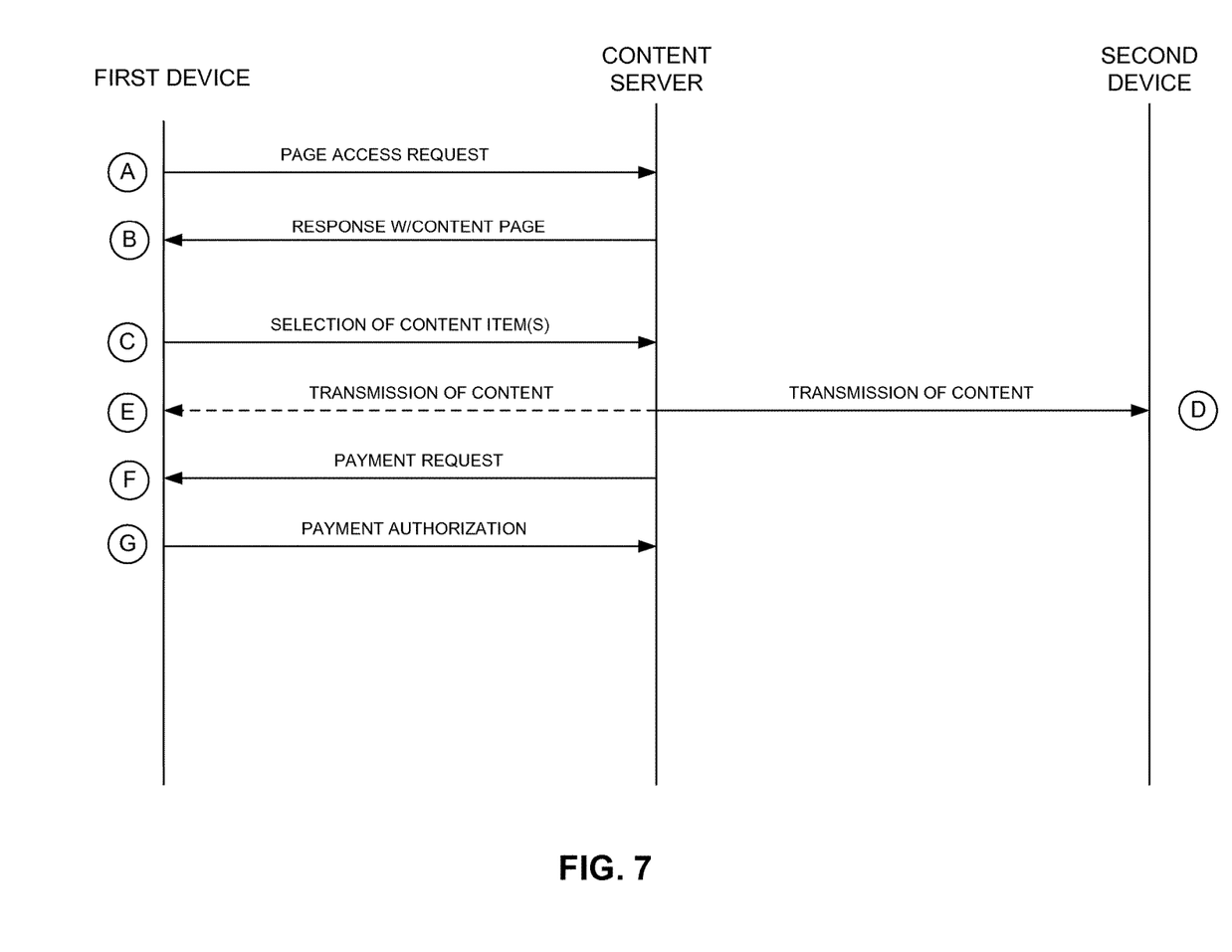
FIG. 7 is a diagram of a transmission flow between two user devices and a content server for purchasing and downloading a content item according to one or more aspects described herein.

FIG. 7, describing one embodiment of the invention, is a diagram showing transmission flow for shopping list content items (e.g., items to be purchased) between a first device, a service provider and a second device. As with the diagram of FIG. 6, the first device initially accesses a predefined page of the service provider corresponding to the first device's tier as illustrated by steps A and B. Subsequently, one or more content items may be identified to the service provider for purchase in step C. The content file may then be transmitted in step D and optionally step E to the second device and, in some instances, the first device. However, in contrast to FIG. 6, a payment transaction may be performed between either the first device and the service provider or the second device and the service provider in steps F and G. The payment transaction may also take place either before or after the transmission of the content. In one example, a copyright protected content item may be transmitted prior to payment. However, a license key for accessing the content item might only be transmitted after payment. A full content file (rather than a sample) is also transmitted to either the first device or the second device or both depending on user preferences and the capabilities of each device. Prior to transmitting the content file to the receiving device, the content may be customized based on the receiving device. If there are multiple receiving devices, a copy of the content may be customized for each receiving device. Additionally, any of the devices that have received any of the samples may purchase full content of the samples. A device electing to purchase full content corresponding to a sample may further designate one or more devices, e.g. included in the user account information, for receiving/downloading the full content, and optionally conditions under which the full content is to be received/downloaded.

According to one or more aspects, a receiving device such as PC 115, mobile communication device 105 or 110 or PDA 120 may include a content downloading client to facilitate the transfer of content or samples of content from a service provider like provider 300. The client may be specific to a type of content or may be configured to download multiple types of content from the content server. In one embodiment, a client running on a receiving device may automatically receive or download content that has been wishlisted or purchased by a user.

Figure 8:
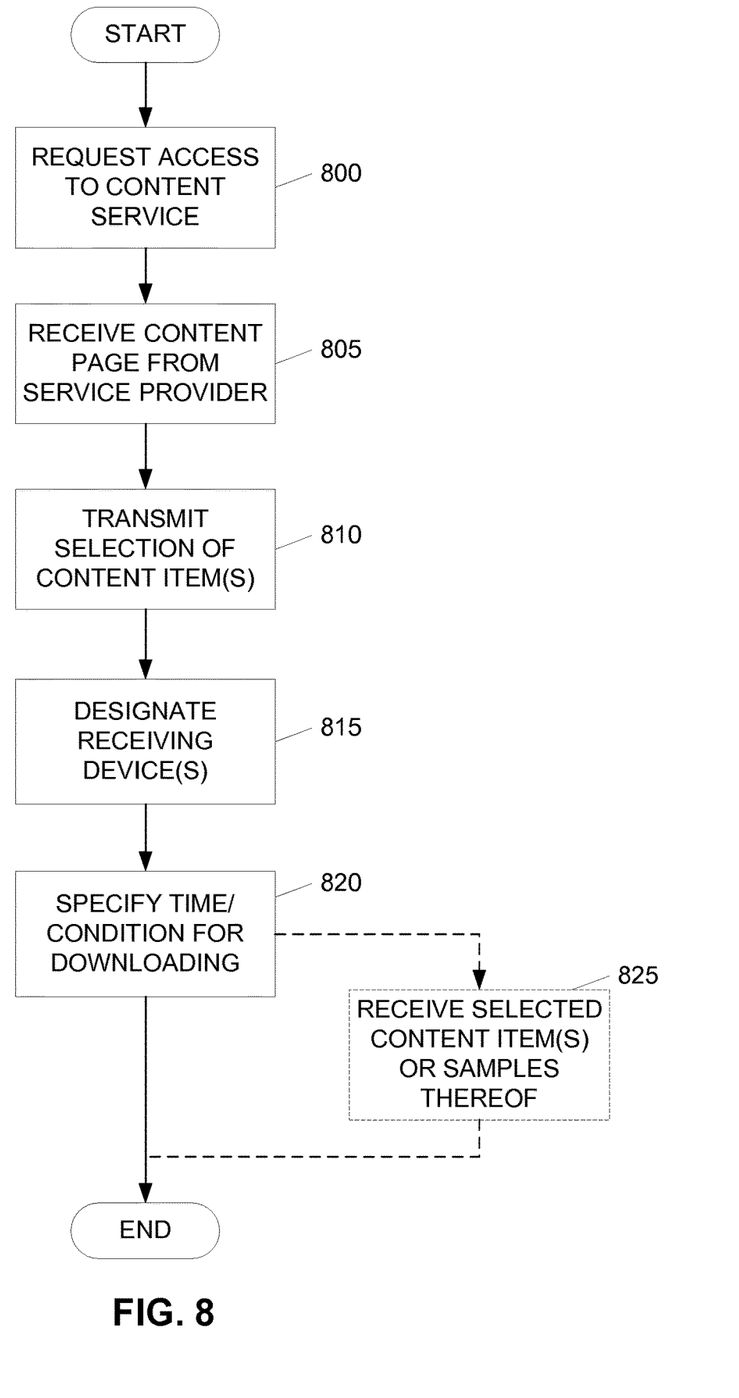
FIG. 8 is a flowchart illustrating a method for selecting desired content items and designating one or more receiving devices for receiving the selected items according to one or more aspects described herein.

FIG. 8, describing one embodiment of the invention, is a flowchart illustrating a method for selecting desired one or more content items and designating one or more receiving devices. In step 800, a user device such as a mobile phone, PC or PDA may request access to a content service from a service provider server. The request may take the form of a HTTP request or other request formats depending on the communication protocol and/or application used. In step 805, the device may receive a response from the service provider with a content service page. The content service page may correspond to a tier of devices to which the user device belongs or is associated. Once the page is received, a user may browse the content listings and other information on the page. In step 810, the device may transmit a selection of one or more content items to the service provider. The selection may also identify a list (e.g., a wishlist or a shopping list) to which the one or more content items is to be added.

In step 815, the device may further designate one or more receiving devices for receiving the selected one or more content items or samples thereof. The designation may be made manually by a user or based on preferences stored in the user device or on the user's account. Alternatively, the designation may include an authorization for the service provider to automatically choose an appropriate receiving device. Further, in step 820, the device may specify a time at which the one or more content items or samples thereof are to be downloaded to the designated receiving device(s). The time may correspond to a condition that must be satisfied. For example, a content item may be scheduled for delivery when the network access cost(s) of a receiving device is below a certain threshold. In another example, a content item may be scheduled for delivery when the receiving device is not roaming. If the user device is designated as a receiving device, the receiving device may subsequently receive the selected one or more content items or samples thereof in step 825.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions and/or other data stored in a read only memory (ROM). In some such embodiments, ROM stores programming instructions that cause IC to perform operations according to one or more of the methods described herein. In at least some other embodiments, one or more the methods described herein are hardwired into IC. In other words, IC is in such cases an application specific integrated circuit (ASIC) having gates and other logic dedicated to the calculations and other operations described herein. In still other embodiments, IC may perform some operations based on execution of programming instructions read from ROM and/or RAM, with other operations hardwired into gates and other logic of IC. Further, IC may output image data to a display buffer.

Further, in one or more embodiments, the content service provider may provide content recommendations to the user by comparing the user's wishlist to other users' wishlists stored in the system of the content service provider. Further, the content service provider may provide commercials to the user based on the content on the wishlist. In an additional embodiment, the content service provider may provide electronic coupons or vouchers, e.g. including offers or benefits that the user may use for downloading content from the wishlist.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
generating a list of one or more content items specified by a first device;
receiving, from the first device, a selection of a second device to receive a portion of the one or more content items;
determining a particular tier among a plurality of tiers to which the second device belongs, wherein the plurality of tiers corresponds to a plurality of sets of device capabilities;
creating a sample of the portion of the one or more content items according to the determined tier of the second device;
determining downloading condition of a network connection for the second device to receive the sample; and
determining to deliver the sample to the second device based on the determined downloading condition.

2. The method of claim 1, further comprising:
presenting the list of the one or more content items; and
presenting a stream option to stream the sample to the second device in accordance with the determined tier.

3. The method of claim 1, further comprising:
designating, by the first device, a third device to receive the portion or a new portion of the one or more content items.

4. The method of claim 1, further comprising:
presenting an option to purchase, by the second device, the one or more content items corresponding to the received portion of the one or more content items.

5. The method of claim 1, further comprising:
initiating automatic download of the sample to the second device, wherein the second device is among a plurality of devices associated with an account corresponding to the first device.

6. The method of claim 1, wherein the first device is a personal computer, and the second device is a mobile phone.

7. The method of claim 1, wherein the device capabilities relate to downloading capability, storage capacity, media rendering capabilities, digital rights management enforcement feature, hardware transmission component, functionality of content service pages, or a combination thereof.

8. The method of claim 1, wherein the downloading condition of the network connection includes at least one of bandwidth utilized to receive the sample, network connection stability, and network access costs.

9. An apparatus comprising:
at least one processor; and
at least one memory including computer program code, the at least one memory and the computer program code configured to, with the at least one processor, cause the apparatus at least to,
generate a list of one or more content items specified by a first device;
receive, from the first device, a selection of a second device to receive a portion of the one or more content items;
determine a particular tier among a plurality of tiers to which the second device belongs, wherein the plurality of tiers corresponds to a plurality of sets of device capabilities;
create a sample of the portion of the one or more content items according to the determined tier of the second device;
determine downloading condition of a network connection for the second device to receive the sample; and
determine to deliver the sample to the second device based on the determined downloading condition.

10. The apparatus of claim 9, wherein the apparatus is further caused to:
present the list of the one or more content items; and
present a stream option to stream the sample to the second device in accordance with the determined tier.

11. The apparatus of claim 9, wherein the apparatus is further caused to:
designate, by the first device, a third device to receive the portion or a new portion of the one or more content items.

12. The apparatus of claim 9, wherein the apparatus is further caused to:
present an option to purchase, by the second device, the one or more content items corresponding to the received portion of the one or more content items.

13. The apparatus of claim 9, wherein the apparatus is further caused to:
initiate automatic download of the sample to the second device, wherein the second device is among a plurality of devices associated with an account corresponding to the first device.

14. The apparatus of claim 9, wherein the first device is a personal computer, and the second device is a mobile phone.

15. The apparatus of claim 9, wherein the device capabilities relate to downloading capability, storage capacity, media rendering capabilities, digital rights management enforcement feature, hardware transmission component, functionality of content service pages, or a combination thereof.

16. The apparatus of claim 9, wherein the downloading condition of the network connection includes at least one of bandwidth utilized to receive the sample, network connection stability, and network access costs.

17. A system comprising:
a content server configured to,
generate a list of one or more content items specified by a first device;
receive, from the first device, a selection of a second device to receive a portion of the one or more content items;

determine a particular tier among a plurality of tiers to which the second device belongs, wherein the plurality of tiers corresponds to a plurality of sets of device capabilities;

create a sample of the portion of the one or more content items according to the determined tier of the second device;

determine downloading condition of a network connection for the second device to receive the sample; and determine to deliver the sample to the second device based on the determined downloading condition.

18. The system of claim 17, wherein the content server is further configured to:

present the list of the one or more content items; and present a stream option to stream the sample to the second device in accordance with the determined tier.

19. The system of claim 17, wherein the content server is further configured to:

designate, by the first device, a third device to receive the portion or a new portion of the one or more content items.

20. The system of claim 17, wherein the content server is further configured to:

initiate automatic download of the portion of the one or more content items to the second device, wherein the downloading condition of the network connection includes at least one of bandwidth utilized to receive the sample, network connection stability, and network access costs.

* * * * *